US012793248B2

(12) United States Patent
Cole et al.

(10) Patent No.: US 12,793,248 B2
(45) Date of Patent: Nov. 10, 2026

(54) VIDEO CHARACTERISTIC DETERMINATION FROM VIDEOS CAPTURED WITH LIMITED MOTION CAMERA

(71) Applicant: Google LLC, Mountain View, CA (US)

(72) Inventors: Forrester H. Cole, Lexington, MA (US); Michael Rubinstein, Natick, MA (US); Keith Noah Snavely, Mountain View, CA (US); Zhengqi Li, Jersey City, NJ (US); William Freeman, Acton, MA (US); Zhoutong Zhang, Waltham, MA (US)

(73) Assignee: Google LLC, Mountain View, CA (US)

( * ) Notice: Subject to any disclaimer, the term of this patent is extended or adjusted under 35 U.S.C. 154(b) by 190 days.

(21) Appl. No.: 18/856,926

(22) PCT Filed: May 5, 2023

(86) PCT No.: PCT/US2023/021185
§ 371 (c)(1),
(2) Date: Oct. 15, 2024

(87) PCT Pub. No.: WO2023/215577
PCT Pub. Date: Nov. 9, 2023

(65) Prior Publication Data

US 2025/0259323 A1 Aug. 14, 2025

Related U.S. Application Data

(60) Provisional application No. 63/338,980, filed on May 6, 2022.

(51) Int. Cl.
*G06T 7/579* (2017.01)
*G06T 7/70* (2017.01)

(52) U.S. Cl.
CPC ................ *G06T 7/579* (2017.01); *G06T 7/70* (2017.01); *G06T 2207/10016* (2013.01); *G06T 2207/20081* (2013.01); *G06T 2207/20084* (2013.01)

(58) Field of Classification Search
CPC . G06T 7/579; G06T 7/70; G06T 2207/10016; G06T 2207/20081; G06T 2207/20084; G06V 10/82; G06V 20/64
See application file for complete search history.

(56) References Cited

U.S. PATENT DOCUMENTS

2019/0279082 A1 * 9/2019 Moloney .................. G06N 3/08
2020/0242804 A1 * 7/2020 Eisenmann ............... G06T 7/80
(Continued)

OTHER PUBLICATIONS

Agarwal et al., "Bundle adjustment in the large," Paper, Presented at proceedings of the European conference on computer vision, Hersonissos, Greece, Sep. 5-11, 2010; LNCS, 2010, 6312, pp. 29-42.
(Continued)

*Primary Examiner* — Aaron W Carter
(74) *Attorney, Agent, or Firm* — Fish & Richardson P.C.

(57) ABSTRACT

Methods, systems, and apparatus, including medium-encoded computer program products, for determining video characteristics from videos captured with limited motion cameras. A first set of pairs of images can be selected from a video taken with a limited motion camera. Using the images, a neural network can first be trained for camera parameters while holding the network weights constant. After performing the first training, a second set of pairs of images can be selected from the video. A second training of the neural network can be performed and can include adjusting the camera parameters and the network weights in the neural network. After performing the second training, the
(Continued)

camera parameters and the network weights of the neural network can be persisted.

14 Claims, 5 Drawing Sheets

(56) References Cited

U.S. PATENT DOCUMENTS

| | | | | |
|---|---|---|---|---|
| 2022/0156882 | A1* | 5/2022 | Chawla | G06F 18/2148 |
| 2024/0070917 | A1* | 2/2024 | Hagemann | G06T 7/80 |
| 2024/0078471 | A1* | 3/2024 | Kim | G06N 20/00 |
| 2025/0029321 | A1* | 1/2025 | Sasagawa | G06V 10/771 |
| 2025/0157179 | A1* | 5/2025 | Ravi Kumar | G06V 10/25 |
| 2025/0259323 | A1* | 8/2025 | Cole | G06V 10/82 |

OTHER PUBLICATIONS

Bescos et al., "DynaSLAM: Tracking, Mapping and Inpainting in Dynamic Scenes," IEEE Robotics and Automation Letters, Oct. 2018, 3(4):4076-4083.
Bloesch et al., "CodeSLAM—Learning a Compact, Optimisable Representation for Dense Visual SLAM," Paper, Presented at Proceedings of the IEEE/CVF Conference on Computer Vision and Pattern Recognition, Salt Lake City, UT, USA, Jun. 18-23, 2018, pp. 2560-2568 (Author Manuscript).
Bogdan et al., "DeepCalib: A Deep Learning Approach for Automatic Intrinsic Calibration of Wide Field-of-View Cameras," Paper, Presented at the Proceedings of the 15th ACM SIGGRAPH European Conference on Visual Media Production, London, United Kingdom, Dec. 13-14, 2018, 10 pages.
Butler et al., "A naturalistic open-source movie for optical flow evaluation," Paper, Presented at proceedings of the European conference on computer vision, Florence, Italy, Oct. 7-13, 2012; LNCS, 2012, 7577:611-625.
Casser et al., "Depth Prediction without the Sensors: Leveraging Structure for Unsupervised Learning from Monocular Videos," Paper, Presented at the Proceedings of the AAAI Conference on Artificial Intelligence, Honolulu, Hawaii, Jan. 27-Feb. 1, 2019; AAAI-19, Jul. 2019 33(1):8001-8008.
Chen et al., "Self-supervised Learning with Geometric Constraints in Monocular Video Connecting Flow, Depth, and Camera," Paper, Presented at Proceedings of the IEEE/CVF International Conference on Computer Vision, Seoul, Korea (South), Oct. 27-Nov. 2, 2019, pp. 7063-7072 (Author Manuscript).
Colmap.github.io [online], "Colmap," available on or before Jan. 11, 2022, via Internet Archive: Wayback Machine URL <https://web.archive.org/web/20220111001231/https://colmap.github.io/>, retrieved on Jun. 24, 2025, 3 pages.
Davison et al., "MonoSLAM: Real-Time Single Camera SLAM," IEEE Transactions on Pattern Analysis and Machine Intelligence, Jan. 2007, 29(6), 16 pages.
Eigen et al., "Depth Map Prediction from a Single Image using a Multi-Scale Deep Network," CoRR, Submitted on Jun. 9, 2014, arXiv:1406.2283v1, 9 pages.
Engel et al., "Direct Sparse Odometry," IEEE Transactions on Pattern Analysis and Machine Intelligence, Mar. 2018, 40(3):611-625.
Engel et al., "LSD-SLAM: Large-scale direct monocular SLAM," Paper, Presented at Proceedings of the European Conference on Computer Vision, Zurich, Switzerland, Sep. 6-12, 2014; LNCS, 2014, 8690:834-849.
Github.com [online], "Robust Consistent Video Depth Estimation," Jun. 2021, retrieved on June 23, 2025, retrieved from URL <https://github.com/facebookresearch/robust cvd>, 3 pages.
International Preliminary Report on Patentability in International Appln. No. PCT/US2023/021185, mailed on Nov. 21, 2024, 11 pages.
International Search Report and Written Opinion in International Appln. No. PCT/US2023/021185, mailed on Aug. 11, 2023, 17 pages.
Izadi et al., "KinectFusion: Real-time 3D Reconstruction and Interaction Using a Moving Depth Camera," Paper, Presented at the Proceedings of the 24th annual ACM symposium on User interface software and technology, Santa Barbara, CA, USA, Oct. 16-19, 2011, pp. 559-568.
Kendall et al., "What Uncertainties Do We Need in Bayesian Deep Learning for Computer Vision?," Paper, Presented at the Proceedings of the 31st International Conference on Neural Information Processing Systems, Long Beach, CA, USA, Dec. 4-9, 2017; Advances in Neural Information Processing Systems, Dec. 2016, 29:1-11.
Kerl et al., "Dense Visual SLAM for RGB-D Cameras," Paper, Presented at the IEEE/RSJ International Conference on Intelligent Robots and Systems, Tokyo, Japan, Nov. 3-7, 2013, 7 pages.
Kingma et al., "Adam: A Method for Stochastic Optimization," CoRR, Submitted on Dec. 22, 2014, arXiv:1412.6980v1, 9 pages.
Kopf et al., "Robust Consistent Video Depth Estimation," Paper, Presented at Proceedings of the IEEE/CVF Conference on Computer Vision and Pattern Recognition (CVPR), Nashville, TN, USA, Jun. 20-25, 2021, pp. 1611-1621 (Author Manuscript).
Li et al., "Blind Geometric Distortion Correction on Images Through Deep Learning," Paper, Presented at Proceeding of the IEEE/CVF Conference on Computer Vision and Pattern Recognition (CVPR), Long Beach, CA, USA, Jun. 15-20, 2019, pp. 4855-4864 (Author Manuscript).
Lopez-Antequera et al., "Deep Single Image Camera Calibration With Radial Distortion," Paper, Presented at Proceedings of the IEEE/CVF Conference on Computer Vision and Pattern Recognition (CVPR), Long Beach, CA, USA, Jun. 15-20, 2019, pp. 11817-11825 (Author Manuscript).
Luo et al., "Consistent Video Depth Estimation," ACM Transactions on Graphics, Jul. 2020, 39(4):71, 1-13.
Mur-Artal et al., "ORB-SLAM2: An Open-Source SLAM System for Monocular, Stereo, and RGB-D Cameras," IEEE Transactions on Robotics, Jun. 2017, 33(5), pp. 1-8.
Newcombe et al., "DTAM: Dense Tracking and Mapping in Real-Time," Paper, Presented at the International Conference on Computer Vision, Barcelona, Spain, Nov. 6-13, 2011, 8 pages (Author Manuscript).
Newcombe et al., "DynamicFusion: Reconstruction and Tracking of Non-rigid Scenes in Real-Time," Paper, Presented at the IEEE Conference on Computer Vision and Pattern Recognition (CVPR), Boston, MA, USA, Jun. 7-12, 2015, pp. 343-352 (Author Manuscript).
Perazzi et al., "A Benchmark Dataset and Evaluation Methodology for Video Object Segmentation," Paper, Presented at the IEEE Conference on Computer Vision and Pattern Recognition (CVPR), Las Vegas, NV, USA, Jun. 27-30, 2016, pp. 724-732 (Author Manuscript).
Ranftl et al., "Towards Robust Monocular Depth Estimation: Mixing Datasets for Zero-Shot Cross-Dataset Transfer," IEEE Transactions on Pattern Analysis and Machine Intelligence, Aug. 2020, 44(3):1623-1637.
Schonberger et al., "Pixelwise View Selection for Unstructured Multi-View Stereo," Paper, Presented at Proceedings of the European Conference on Computer Vision, Amsterdam, The Netherlands, Oct. 11-14, 2016; LNCS, 2016, 9907:501-518.
Schonberger et al., "Structure-from-Motion Revisited," Paper, Presented at the IEEE Conference on Computer Vision and Pattern Recognition (CVPR), Las Vegas, NV, USA, Jun. 27-30, 2016, pp. 4104-4113 (Author Manuscript).
Sturm et al., "A Benchmark for the Evaluation of Rgb-D SLAM Systems," Paper, Presented at the IEEE/RSJ International Conference on Intelligent Robots and Systems, Vilamoura-Algarve, Portugal, Oct. 7-12, 2012, 8 pages (Author Manuscript).
Teed et al., "DROID-SLAM: Deep Visual SLAM for Monocular, Stereo, and RGB-D Cameras," Paper, Presented at the 35th Conference on Neural Information Processing Systems, Virtual Event, Dec. 6-14, 2021; Advances in Neural Information Processing Systems, Dec. 2021, 34:1-12.

(56) References Cited

OTHER PUBLICATIONS

Teed et al., "RAFT: Recurrent All-Pairs Field Transforms for Optical Flow," Paper, Presented at Proceedings of the European Conference on Computer Vision, Glasgow, UK, Aug. 23-28, 2020; LNCS, 2020, 12347:402-419.
Torresani et al., "Non-Rigid Structure-From-Motion: Estimating Shape and Motion with Hierarchical Priors," IEEE Transactions on Pattern Analysis and Machine Intelligence, May 2008, 30(5):878-892.
Triggs et al., "Bundle adjustment—a modern synthesis," Paper, Presented at Proceedings of the International Workshop on Vision Algorithms, Corfu, Greece, Sep. 21-22, 1999; LNCS, 2000, 1883:298-372.
Umeyama, "Least-Squares Estimation of Transformation Parameters Between Two Point Patterns," IEEE Transactions on Pattern Analysis and Machine Intelligence, Apr. 1991, 13(4):376-380.
Vijayanarasimhan et al., "SfM-Net: Learning of Structure and Motion from Video," CoRR, Submitted on Apr. 25, 2017, arXiv:1704.07804v1, pp. 1-9.
Yang et al., "D3VO: Deep Depth, Deep Pose and Deep Uncertainty for Monocular Visual Odometry," Paper, Presented at the IEEE/CVF Conference on Computer Vision and Pattern Recognition (CVPR), Seattle, WA, USA, Jun. 13-19, 2020, pp. 1281-1292 (Author Manuscript).
Zhang et al., "Consistent Depth of Moving Objects in Video," ACM Transactions on Graphics, Aug. 2021, 40(4):148, 1-12.
Zhang et al., "Structure and Motion from Casual Videos," Paper, Presented at Proceedings of the European Conference on Computer Vision, Tel Aviv, Israel, Oct. 23-27, 2022; LNCS, 2022, 13693:20-37.

* cited by examiner

VIDEO CHARACTERISTIC DETERMINATION FROM VIDEOS CAPTURED WITH LIMITED MOTION CAMERA

CROSS-REFERENCE TO RELATED APPLICATION

This application is a National Stage Application under 35 U.S.C. § 371 and claims the benefit of International Application No. PCT/US2023/021185, filed May 5, 2023, which claims the benefit of U.S. Provisional Pat. App. No. 63/338,980, filed May 6, 2022, which is incorporated by reference.

BACKGROUND

This specification relates to training machine learning models to determine the depth of objects in video produced with a monocular camera. Accurately determining the depth of objects in video produced with a monocular camera can be challenging, especially when there is minimal camera motion and therefore in limited parallax.

SUMMARY

This specification generally describes systems and methods for training machine learning models, and more specifically to training machine learning models to determine the depth of objects in a monocular video, including cases when the video was produced by a camera that is largely stationary and the video captures moving objects.

In general, one or more aspects of the subject matter described in this specification can be embodied in one or more methods (and also one or more non-transitory computer-readable mediums tangibly encoding a computer program operable to cause data processing apparatus to perform operations) including the following. In one aspect, a method includes selecting, from a set of images of a video captured by an imaging device, a first set of pairs of images. A first training of the neural network that includes training camera parameters and network weights is performed and includes adjusting the camera parameters in the neural network while holding the network weights constant. After performing the first training, a second set of pairs of images are selected from the set of images captured by the imaging device. A second training of the neural network is performed and includes adjusting the camera parameters and the network weights in the neural network. After performing the second training, the camera parameters and the network weights of the neural network are persisted.

One or more of the following features can be included. The first set of pairs of images can include all pairs of images in the set of images. The first set of pairs of images can be selected from a plurality of sliding windows, and each sliding window can include a fixed number of contiguous images of the set of images. The first set of pairs of images can include all pairs of images from the plurality of sliding windows. The second set of pairs of images can include all pairs of images in the set of images. The second set of pairs of images can be selected based on a relative position of the images in the video. For each pair of images in the set of images, each pair of images including a first image and a second image, an order of the images can be determined, and the relative position of the images can be the absolute value of differences of the sequential indices of the first image and the second image. The first image and the second image can be selected as a pair of images only if the relative position is a power of two. The first training of positional features in the neural network can include determining a reprojection loss. The first training of positional features in the neural network can include determining a depth prior loss.

Particular embodiments of the subject matter described in this specification can be implemented so as to realize one or more of the following advantages. The techniques described below can be used to determine estimated camera poses and dense depth maps from a monocular, "casually-captured video." As used herein, a "casually-capture video" or "casual video" is a video that has been captured by a camera with limited movement of the camera during capture. Such videos, because of the limited camera motion, do not have enough parallax to satisfy structure from motion processing techniques. Structure from motion processing techniques are typically used for videos captured by cameras undergoing significant motion while filming, such as a video of the interior of a house captured during a video walk-through. More specifically, a "casual video" is a video taken from a relatively stationary monocular camera where the resulting video does not have sufficient parallax from which structure can be determined from a structure from motion technique.

The techniques can further be used to produce estimates of various video characteristics, such as camera rotation, camera translation and/or movement maps. In addition, the techniques do not require known camera poses. The technique can also be used to optimize for per-pixel movement maps to modulate the training loss in moving areas.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes systems and methods for training machine learning models, and more specifically to training machine learning models to determine the depth of objects in a monocular video, including cases when the video was produced by a camera that is largely stationary. For example, a user might capture video of a panoramic scene with a mobile telephone that includes a video camera. To capture the scene, the user might minimally rotate his or her wrist to capture the breadth of the scene, and the video might last only a few seconds. Again, videos produced by a monocular camera with limited camera movement are termed "casual videos," and the limited camera motion of casual videos can result in very limited parallax, complicating analysis of the video.

As previously described, structure-from-motion (SfM) and related methods for three-dimensional (3D) reconstruction from monocular video can produce accurate depth estimations for stationary scenes produced by large camera motions, such as a video of a walkthrough of a house, or a video taken from a car driving down a street. However, videos taken under casual conditions often violate these assumptions. The operator is often standing roughly stationary, capturing moving subjects such as people and pets. Under these conditions, SfM approaches can produce inaccurate results. In addition, when SfM is inaccurate, it can produce results that differ substantially from correct estimations.

This specification describes techniques for video characteristic determination, including for casual videos. The techniques include a joint optimization of cameras and 3D structure over the video. In addition, the techniques optimize dense 3D correspondences, making fine adjustments to a pre-trained depth prediction network on the input video. The techniques do not require known camera poses—that is, the location of camera while the video is captured need not be known. The techniques can produce estimates of various video characteristics, such as camera rotation, camera translation, dense depth maps and/or movement maps.

Figure 1A:
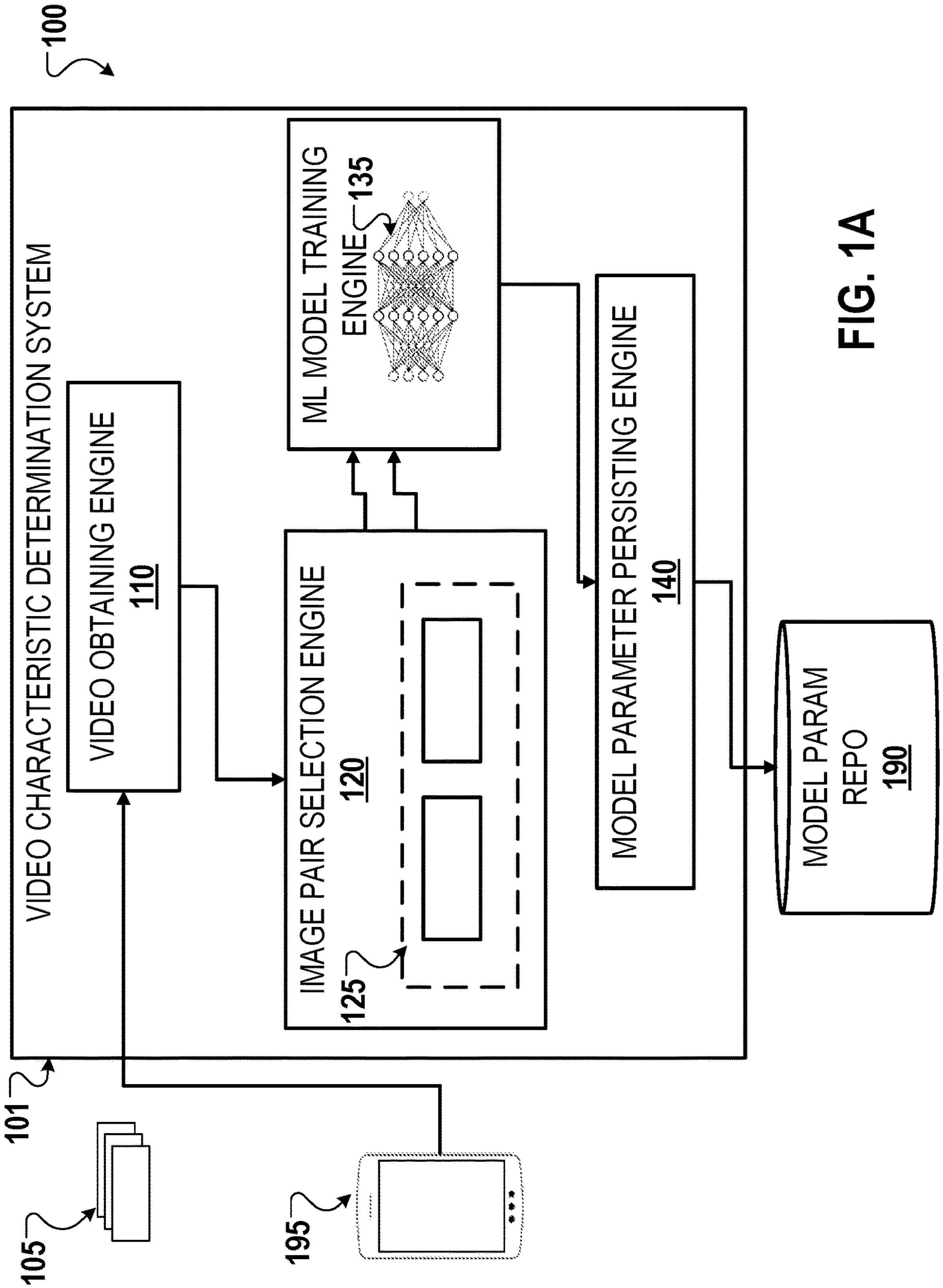
FIG. 1A shows an example of an environment for video characteristic determination from casual video.

FIG. 1A shows an example of an environment 100 for video characteristic determination from casual video. The environment can include one or more user devices 195, a video characteristic determination system 101 and a model parameter repository 190.

A user device 195, which can also be called an imaging device, is an electronic device that is capable of capturing video data 105 ("video 105" or "videos 105," for brevity) and making the videos 105 available to the video characteristic determination system 101, e.g., by communicating over the network. Example user devices 195 include mobile communication devices, e.g., smart phones and/or tablet computers personal computers, gaming devices, server computers, and other devices that can capture and provide videos 105. A user device can also include a digital assistant device that accepts audio input through a microphone and outputs audio output through speakers. The digital assistant device can also include a camera and/or display to capture videos 105 and visually present information. A user device can also include a digital media device, e.g., a streaming device that plugs into a television or other display to stream videos to the television, a gaming device, or a virtual reality system.

A user device 195 can include applications 112, such as web browsers and/or native applications, including camera applications, to facilitate the capturing of videos 105 and the sending and receiving of data over the network. A native application is an application developed for a particular platform or a particular device (e.g., mobile devices having a particular operating system). Although operations may be described as being performed by the user device 195, such operations may be performed by an application 112 running on the user device 195.

Videos 105 are data including multiple frames that together represent a moving image. The motion of images can result from the motion of the user device 195, motion of the subjects of the images, or of both. Videos 105 can be encoded in any suitable format. For example, video data can be encoded in formats such as Moving Picture Experts Group-4 (MP-4), Audio Video Interleave (AVI), VP9 and WEBM, among other examples. Videos 105 can consist of frames. A frame of video is the image that will be rendered on a display at a particular instant of time, and in the context of video, the term "frame" and "image" can be used interchangeably. Thus, videos 105 include image data in the form of multiple image frames (or simply "images").

The model parameter repository 190 can store the parameters of the trained ML model 135. The model parameter repository 190 can be any suitable data storage system, and can include one or more storage devices in one or more locations. Example storage devices can include relational databases, object databases, file systems, block storage devices, and so one. In various implementations, the model parameter repository can be coupled to the video characteristic determination system 101 and/or included in the video characteristic determination system. In some implementations, some storage devices included in the model parameter repository 190 are included in the video characteristic determination system 101 and other storage devices are coupled to the video characteristic determination system 101.

The video characteristic determination system 101 can train an ML model 135 to determine the depth of objects in a monocular video. The video characteristic determination system 101 can include a video obtaining engine 110, an image pair selection engine 120, a machine learning (ML) model training engine 130 and a model parameter persisting engine 140.

The video obtaining engine 110 can obtain videos 105 from user devices 195 (e.g., user devices that capture or otherwise obtain videos), from video repositories and/or from other devices or systems (e.g., server systems) coupled to the video characteristic determination system 101. The video obtaining engine 110 can provide the videos 105 to the image pair selection engine 120.

The image pair selection engine 120 can select image pairs 125 from videos 105, and provide the image pairs 125 to the ML model training engine 130. The techniques of this specification can include multiple training phases, which can each use sets of image pairs. For each training phase, as described below, the image pair selection engine 120 can select image pairs 125 from a video 105 using different techniques, and can provide differing numbers of image pairs 125 to the ML model training engine 130.

The machine learning (ML) model training engine 130 can accept image pairs and train a ML model 130. The machine learning (ML) model training engine 130 can train the ML model 130 in phases, and in each phase, train the ML 130 using different sets of image pairs from a video 105 and train different components of the ML model 130. Training of the ML model 130 is described further below, including reference to FIG. 2.

Figure 1B:
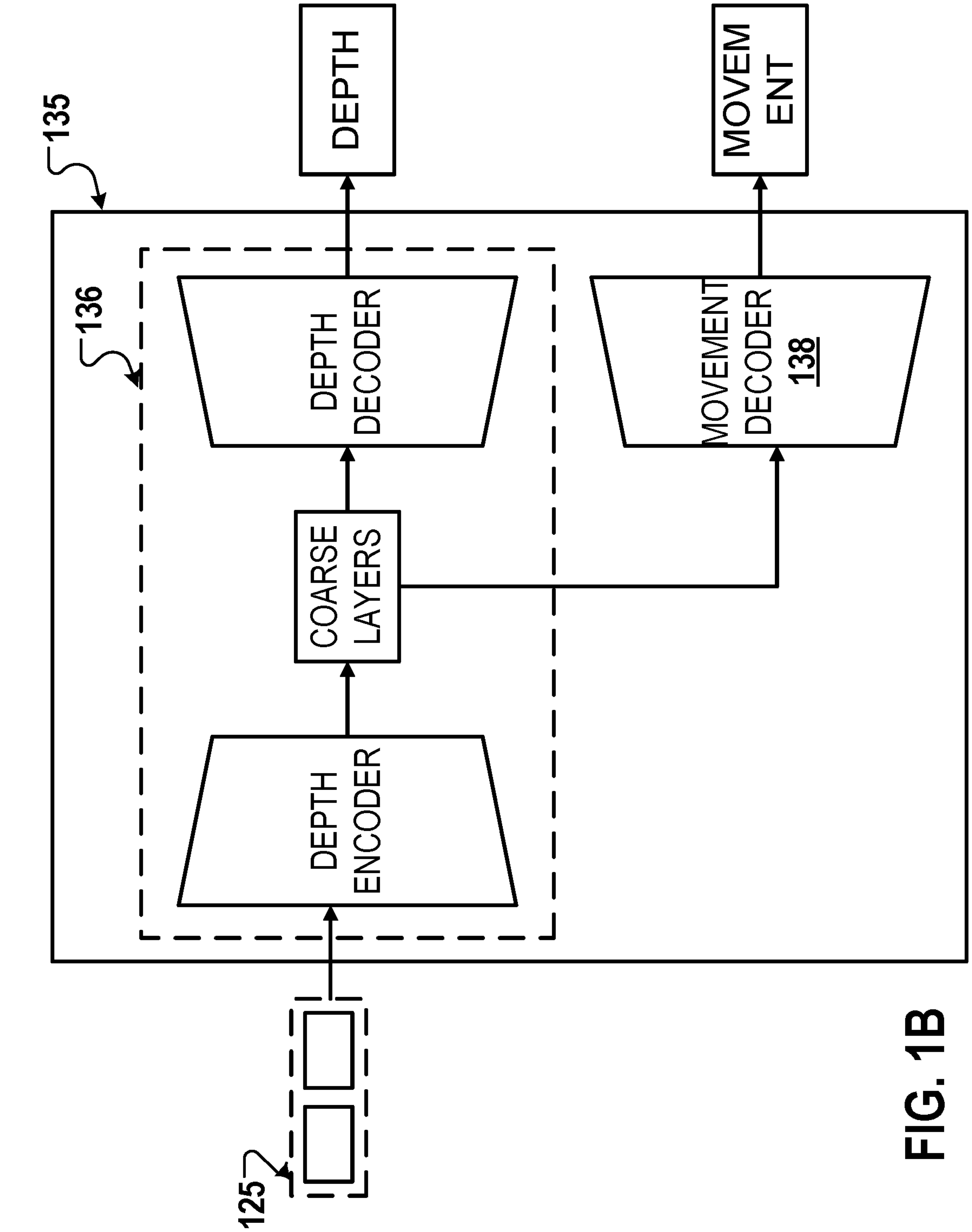
FIG. 1B shows an example ML model that can be used by the video characteristic determination system.

FIG. 1B shows an example ML model 130 that can be used by the video characteristic determination system 101. The ML model 130 can include a monocular depth prediction network 136 (e.g., as described in Ranftl, R., Lasinger, K., Hafner, D., Schindler, K., Koltun, V., "Towards robust monocular depth estimation: Mixing datasets for zero-shot cross-dataset transfer," IEEE Transactions on Pattern Analysis and Machine Intelligence (TPAMI) (2020), or any other appropriate monocular depth prediction network) and a movement prediction decoder branch 138. The movement predictor decoder branch 138 can be a neural network, such as a convolutional neural network or U-net with skip connections. For example, the movement predictor decoder branch 138 can have eight convolution layers with two bi-linear up-sampling layers.

Returning to FIG. 1A, the model parameter persisting engine 140 can accept the parameters that define the trained ML model 130, such as the neuron weights, and provide them to a model parameter repository 190. The model parameter repository 190 can be any appropriate data storage system. For example, the model parameter repository

190 can be a block storage system, a file system, a relational database, an object database, and so on.

Figure 1C:
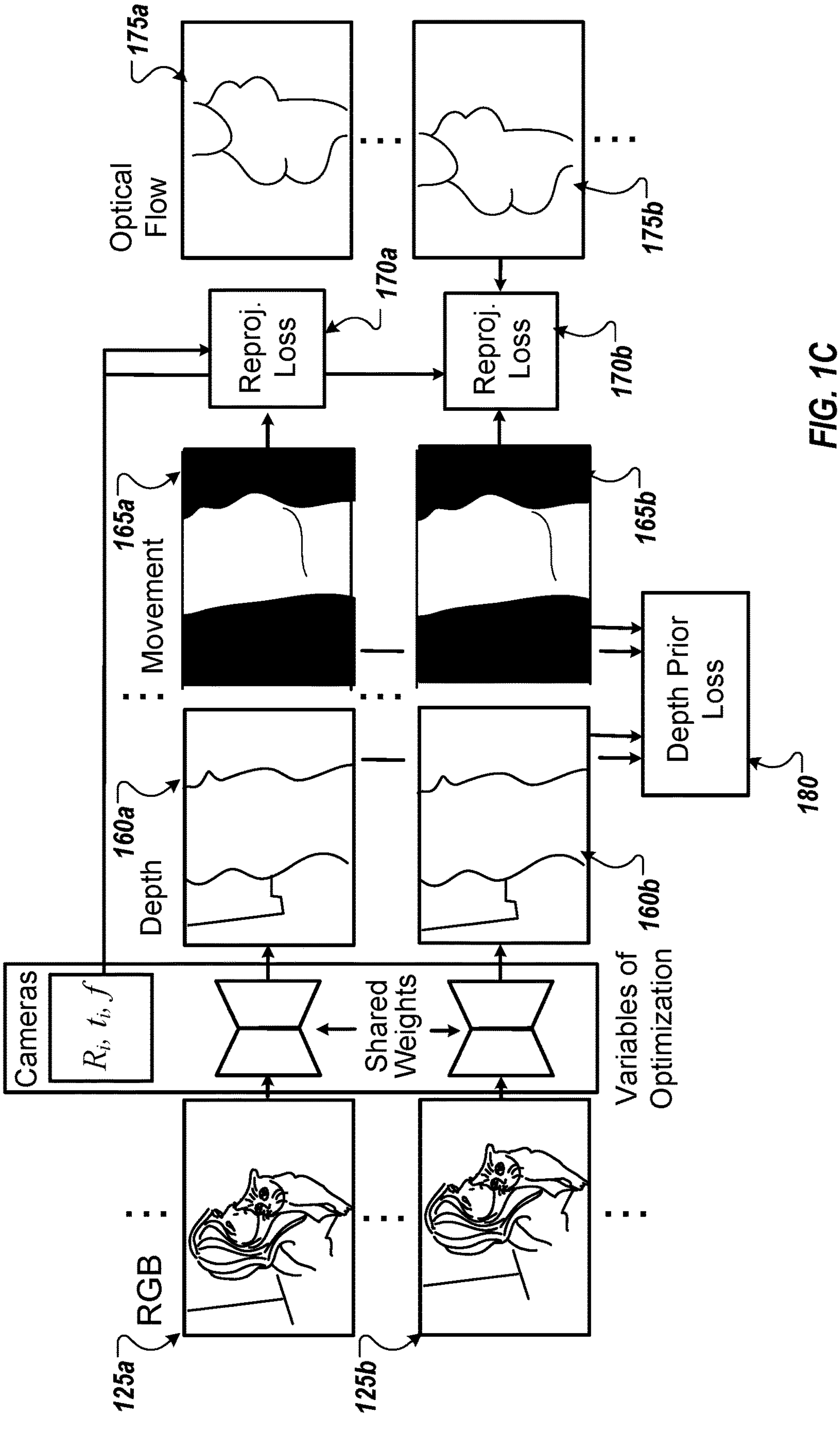
FIG. 1C is an illustration of a global optimization over a video.

FIG. 1C is an illustration of a global optimization over a video. The global optimization uses pairs of images 125*a*, 125*b* included in a video, and optimizes for camera poses Ri, ti, focal length f, and the weights of a monocular depth and movement prediction network 165*a*, 165*b*. The principal loss (Reprojection Loss) compares the reprojection of the depth map 160*a*, 160*b* with the observed optical flow 175*a*, 175*b*, while an auxiliary loss (Depth Prior Loss 180) constrains the optimization to limit deviation from the initial depth estimates. Both losses are weighted by the estimated movement map 165*a*, 165*b*. As described in reference to FIG. 2, only a subset of the weights of the network are optimized.

Figure 2:
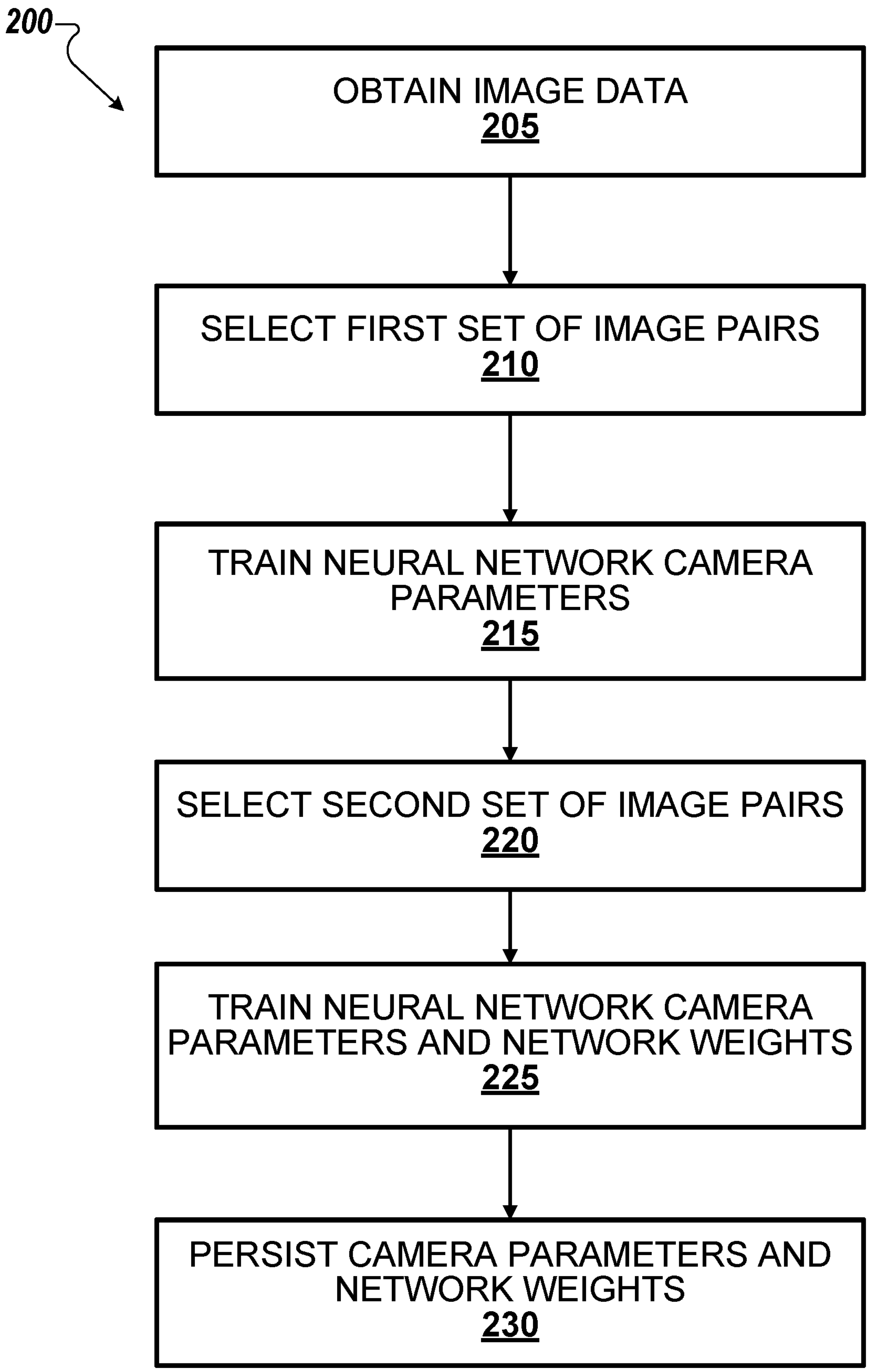
FIG. 2 is a flow diagram of an example process for video characteristic determination from casual video.

FIG. 2 is a flow diagram of an example process for video characteristic determination from casual video. For convenience, the process 200 will be described as being performed by a system for video characteristic determination from casual video, e.g., the video characteristic determination system 101 of FIG. 1, appropriately programmed to perform the process. Operations of the process 200 can also be implemented as instructions stored on one or more computer readable media which may be non-transitory, and execution of the instructions by one or more data processing apparatus can cause the one or more data processing apparatus to perform the operations of the process 200. One or more other components described herein can perform the operations of the process 200.

The techniques described by the process 200 can be expressed as recovering characteristics from images $I_1$, $I_2$, . . . , $I_n$ of a video sequence, where the characteristics can include camera rotations $R_1$, $R_2$, . . . , $R_n$, translations $t_1$, $t_2$, . . . , $t_n$, dense depth maps $D_1$, $D_2$, . . . $D_n$, and/or movement maps $M_1$, $M_2$, . . . , $M_n$. The movement maps are scalar fields with magnitudes that correlate with object motion magnitudes. A pinhole camera model with a projection center in the middle of the image can be used, and the process 200 can also recover the focal length f.

As described above, the process 200 uses collections of pairs of frames, $I_i$ and $I_j$, and the optical flow can be expressed as $flow_{i \to j}$. The camera relative transformation between Ii and Ij, can be expressed as $$R_{i \to j} = R_j R_i^T$$

and $t_{i \to j} = t_j - t_i$. The objective can then be expressed as Equation 1, below:

$$\text{Loss}_{flow}^{i \to j}(x) = L\left(\pi\left(D_i(x) K R_{i \to j} K^{-1} \hat{x} + K t_{i \to j}\right) - x, \text{flow}_{i \to j}(x)\right) \quad (1)$$

Where L is a loss function, x is the pixel coordinate, $\hat{x}$ is x in homogenous coordinates, π(·) is the projection operation (x, y, z)→(x/z, y/z), and K is the camera intrinsics matrix (e.g., a transformation matrix that converts points from the camera coordinate system to a pixel coordinate system) derived from focal length f. Such a formulation is equivalent to bundle adjustment using a geometric reprojection error.

However, when camera motion is dominated by rotation, as can be the case with casual video, Equation 1 can be less effective for optimizing $D_i$ due to the limited parallax, as illustrated by rewriting Equation 1 using disparity (that is, 1/depth) instead of depth, as shown in FIG. 2, below:

$$\text{Loss}_{flow}^{i \to j}(x) = L\left(\pi\left(D_i(x) K R_{i \to j} K^{-1} \hat{x} + 1/D_i(x)\, K t_{i \to j}\right) - x, \text{flow}_{i \to j}(x)\right) \quad (2)$$

When $t_{i \to j}$ is small, the loss term's gradient with respect to $D_i$ small because of the $Kt_{i \to j}$ term. In such cases, an additional constraint can be added to keep the depth consistent according to the optical flow, as shown in Equation 3, below:

$$\text{Loss}_{depth}^{i \to j}(x) = L\left(d\left(D_i(x) R_{i \to j} K^{-1} \hat{x} + t_{i \to j}\right), D_j(x + \text{flow}_{i \to j}(x))\right) \quad (3)$$

Here, d (·) denotes the depth if a 3D point in camera coordinates (x,y,z)→z. As explained further below, the process 200 uses both Equation 1 and Equation 3. Further, the Loss function $\text{Loss}_{flow}$ can be, for example, an L1 loss. Other losses, such as an L2 loss, may alternatively be used. The loss depth, $\text{Loss}_{depth}$, can be the ratio loss from Robust Consistent Video Depth estimation (e.g., as explained in Kopf, J., Rong, X., Huang, J. B., "Robust consistent video depth estimation," IEEE/CVF Conference on Computer Vision and Pattern Recognition (2021), or any other suitable process). The ratio loss can have the form of Equation 4, below:

$$L(a, b) = \left| \frac{\max(a, b)}{\min(a, b)} - 1 \right| \quad (4)$$

The equations described above address small camera translations, but in some cases, do not address object motion. The process 200 estimates object movement as part of joint optimization, the second phase of the optimization process. A Cauchy distribution function can be used where the movement map $M_i$ is the full width at half maximum, γ, of a zero-mean Cauchy distribution, and using a negative-log-likelihood. An example of such an error function is shown in Equation (5), below:

$$C(x, \text{Loss}) = \log\left(M_i(x) + \frac{\text{Loss}(x^2)}{M_i(x)}\right) \quad (5)$$

A fixed bias, such as 0.5, can be added to Mi to avoid taking the logarithm of 0.

The full reprojection loss thus becomes Equation 6, below:

$$\text{Loss}_{reproj}^{i \to j}(x) = \frac{1}{N} \sum_x \left(C\left(x, \text{Loss}_{flow}^{i \to j}(x) + C\left(x, \text{Loss}_{depth}^{i \to j}(x)\right)\right)\right) \quad (6)$$

The machine learning model learns the uncertainty $M_i$ during training, where the optimization can reduce $M_i$ where such reduction is effective, and increase $M_i$ when $M_j$ cannot be reduced. Informally, $M_i$ becomes a measure of how far an outlier the optical flow x is from the expected ego-flow, which is in turn an estimate of how much object movement is present.

While the techniques described above encourage an accurate movement map $M_i$, by design they do not penalize inaccurate depth estimates where $M_i$ is large. Where $M_i$ is large and the reprojection loss is unreliable, the techniques can use the depth prior. Specifically, the depth estimate D can be constrained to the initial depth estimate $D^{init}$ using a movement-weighted version of the scale invariant loss. The depth prior loss can, in some examples, be determined as shown in Equation 7, below:

$$L^i_{prior} = \frac{1}{N}\sum_X M_i(x)\left(\log\frac{D_i(x)}{D_i^{init}(x)} + a\right)^2,\ a = \frac{1}{N}\sum_x \log\left(\frac{D_i^{init}(x)}{D_i(x)}\right) \quad (7)$$

Finally, the total loss function used for optimizing a pair of images can be a weighted sum of the reprojection loss and depth prior loss. An example of a total loss is shown in Equation 8, below:

$$L^{i,j}_{total} = L^{i\to j}_{reproj} + \lambda L^i_{prior} \quad (8)$$

In some implementations the weight, λ, can be 1.

To optimize over collection of pairs, $$L^{i,j}_{total}$$

can be averaged over all pairs for the total loss, $L_{total}$.

Returning to FIG. 2, the system can obtain (205) image data using any appropriate technique. For example, the system can provide an Application Programming Interface (API) which, when called by a device that contains a video that contains image data, enables the device to provide the image data. In another example, the system can obtain the image data from a storage system such as a file system or a relational database using techniques appropriate to the storage system, such as using a file system API or Structured Query Language (SQL) calls provided by a relational database.

The system can select (210) a first set of pairs of images from a set of images of a video captured by an imaging device. In some implementations, the system can select all pairs of images from the video. For example, if a video contains N images, the system can select image pairs (1,2), (1,3), . . . , (1,N), (2,3), (2,4), . . . (2,N), . . . , (N−1, N).

In some implementations, the pair of images can be selected from sliding windows, where each sliding window can consist of a fixed number of contiguous images (e.g., 5, 10, 15, and so on). For example, if the sliding window begins at position i, and consists of M images in a window, the system can select from among (i, i+1), (i, i+2), . . . , (i, M), (i+1, i+2), (i+1, i+3), . . . (i+1,M), and so on. In some implementations, the system can select all pairs of images in the sliding windows.

In some implementations, a two-stage optimization during training is used. The system can perform (215) a first training, called initialization, of the neural network that includes camera parameters and network weights, and the first training can include adjusting the camera parameters in the neural network while holding the network weights constant.

First, the scale can be calibrated by assigning a scale variable $s_i$ for each initial depth map $$D_i^{init}.$$

When optimizing $L_{total}$, Di can be determined as:

$$D_i = s_i D_i^{init}.$$

During the initialization phase, the weights of the depth network are fixed while the remaining variables, including $s_i$, are optimized. The system can select a number of frames for the sliding window (e.g., 3, 5, 7, etc.) and $L_{total}$ can be optimized using Equations 1-8 for a configured number of training iterations (e.g., 500, 600, 700, etc.)

As described above, the first training of the camera parameters (since the depth network is fixed) includes determining a reprojection loss and a depth prior loss, which are used to determine the total loss, for example as given by Equation 8.

After performing the first training, the system can select (220), from the set of images captured by the imaging device, a second set of pairs of images. In some implementations, the second set of pairs can be all pairs of images from the set of images.

In some implementations, the second set of pairs of images can be selected based on a relative position of the images in the video. Each image in the video can be assigned a sequential index. The system can then determine, for each possible pair of images, and based on the sequential indices, whether the pair is selected using a configured set of criteria. For example, the system can determine the absolute value difference of the sequential indices (e.g., the absolute value difference between then the first and fourth sequential index is three). The system can then select pairs if the absolute value of the difference of the sequential indices is a power of two. In other examples, the system can use other criteria, e.g., if the absolute value is a multiple of two, a multiple of three, a power of 3, and so on.

The system can then perform (225) second training, the full optimization, of the neural network, where the second training can include adjusting the camera parameters and the network weights in the neural network. In this training phase, the system uses the pairs of images selected in operation 220. As in the first training phase, the scale can be calibrated by assigning a scale variable $s_i$. When optimizing $L_{total}$, Di can be determined as: $D_i = s_i \mathrm{DepthNet}(I_i)$. The system can optimize $L_{total}$ over all the frames in the video, with a collection of image pairs covering the entire set of images. For example, image pair i, j can be sampled if i, j is a power of 2. The system can compute a full gradient for each step and perform gradient descent (GD) for both network weights and camera parameters using an adaptive first-order optimizer (e.g., as described in Kingma, D., Ba, J.: Adam: A method for stochastic optimization. International Conference on Learning Representations (12 2014) or any other adaptive first-order optimizer). The per-parameter weight tuning of as described in Kingma is sufficient to deal with the widely varying gradient magnitudes between the camera parameters and network weights.

After performing the second training, the system can persist (230) the camera parameters and the network weights of the neural network. The system can persist the weights to any appropriate persistence system. For example, the system can persist the weights to a relational database using SQL operations to store the weights in the relational database. In another example, the system can use file system operations to store the weight in a file system. Other persistence systems with corresponding operations can also be used.

Furthermore, in some implementations, after the second training, optimized values of one or more video characteristics obtained during the process 200 are output as estimated video characteristics. The video characteristics can include, for example, one or more estimated camera poses and one or more dense depth maps of the video captured by the imaging device. Alternatively or additionally, the video characteristics can include one or more of: a camera rotation; a camera translation; and/or a movement maps.

Figure 3:
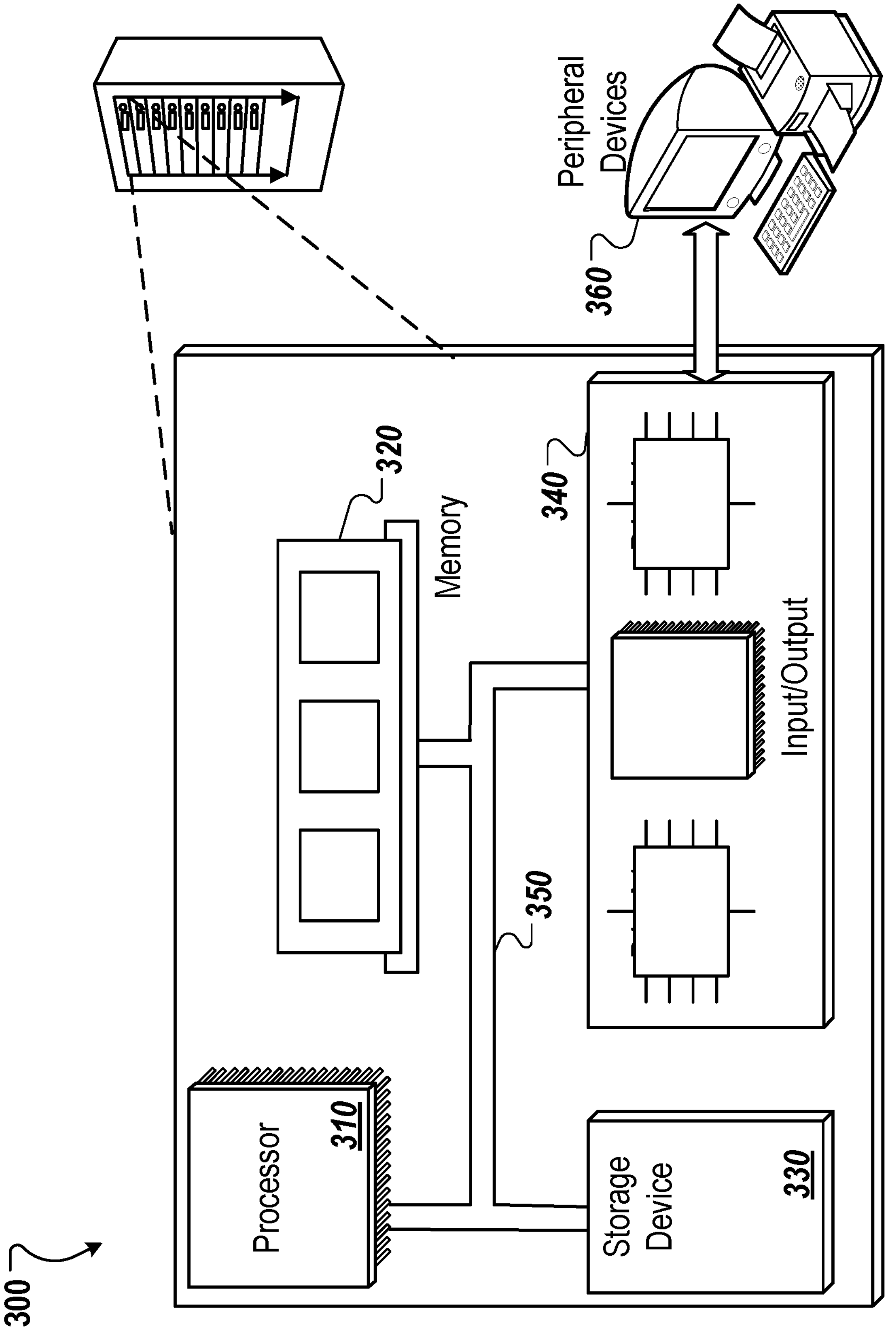
FIG. 3 is a block diagram of an example computer system.

FIG. 3 is a block diagram of an example computer system 300 that can be used to perform operations described above. The system 300 includes a processor 310, a memory 320, a storage device 330, and an input/output device 340. Each of the components 310, 320, 330, and 340 can be interconnected, for example, using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 can include, for example, a hard disk device, an optical disk device, a storage device that is shared over a network by multiple computing devices (e.g., a cloud storage device), or some other large capacity storage device.

The input/output device 340 provides input/output operations for the system 300. In one implementation, the input/output device 340 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 360. Other implementations, however, can also be used, such as mobile computing devices, mobile communication devices, set-top box television user devices, etc.

Although an example processing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for training a neural network to make spatial and motion predictions, comprising:

selecting, from a set of images of a video captured by an imaging device, a first set of pairs of images;

performing first training of the neural network that includes camera parameters and network weights, the first training including adjusting the camera parameters in the neural network while holding the network weights constant;

after performing the first training, selecting, from the set of images captured by the imaging device, a second set of pairs of images;

performing second training of the neural network, the second training including adjusting the camera parameters and the network weights in the neural network; and after performing the second training, persisting the camera parameters and the network weights of the neural network.

2. The computer-implemented method of claim 1 wherein the first set of pairs of images comprises all pairs of images in the set of images.

3. The computer-implemented method of claim 1, wherein the first set of pairs of images are selected from a plurality of sliding windows, and wherein each sliding window is comprised of a fixed number of contiguous images of the set of images.

4. The computer-implemented method of claim 1, wherein the first set of pairs of images comprises all pairs of images from the plurality of sliding windows.

5. The computer-implemented method of claim 1 wherein the second set of pairs of images comprises all pairs of images in the set of images.

6. The computer-implemented method of claim 1 wherein the second set of pairs of images are selected based on a relative position of the images in the video.

7. The computer-implemented method of claim 6 further comprising:

assigning, to each image of the imaged in the video, a sequential index;

determining, for each pair of images in the set of images, wherein each pair comprises a first image and a second image, an order of the images, wherein the relative position of the images is the absolute value of differences of the sequential indices of the first image and the second image; and selecting, as a pair of images in the second set of pairs of images, the first image and the second image only if the relative position is a power of two.

8. The computer-implemented method of claim 1 wherein the first training of camera parameters in the neural network includes determining a reprojection loss.

9. The computer-implemented method of claim 1 wherein the first training of camera parameters in the neural network includes determining a depth prior loss.

10. The method of claim 1, further comprising, after performing the second training, outputting an estimate of one or more video characteristics of the video captured by the imaging device.

11. The method of claim 10, wherein the video characteristics of the video comprise one or more estimated camera poses and one or more dense depth maps of the video captured by the imaging device.

12. The method of claim 11, wherein the video characteristics of the video comprise one or more of: a camera rotation; a camera translation; and/or a movement maps.

13. A system comprising one or more computers and one or more storage devices storing instructions that when executed by the one or more computers cause the one or more computers to perform operations comprising:

selecting, from a set of images of a video captured by an imaging device, a first set of pairs of images;

performing first training of the neural network that includes camera parameters and network weights, the first training including adjusting the camera parameters in the neural network while holding the network weights constant;

after performing the first training, selecting, from the set of images captured by the imaging device, a second set of pairs of images;

performing second training of the neural network, the second training including adjusting the camera parameters and the network weights in the neural network; and after performing the second training, persisting the camera parameters and the network weights of the neural network.

14. One or more non-transitory computer-readable storage media storing instructions that when executed by one or more computers cause the one or more computers to perform operations comprising:

selecting, from a set of images of a video captured by an imaging device, a first set of pairs of images;

performing first training of the neural network that includes camera parameters and network weights, the first training including adjusting the camera parameters in the neural network while holding the network weights constant;

after performing the first training, selecting, from the set of images captured by the imaging device, a second set of pairs of images;

performing second training of the neural network, the second training including adjusting the camera parameters and the network weights in the neural network; and after performing the second training, persisting the camera parameters and the network weights of the neural network.

* * * * *